United States Patent
Benham et al.

(10) Patent No.: US 8,790,579 B2
(45) Date of Patent: *Jul. 29, 2014

(54) CONTINUOUS CATALYST ACTIVATOR

(71) Applicant: Chevron Phillips Chemical Company LP, The Woodlands, TX (US)

(72) Inventors: Elizabeth A. Benham, Spring, TX (US); Max P. McDaniel, Bartlesville, OK (US); Ted H. Cymbaluk, Seabrook, TX (US); Charles K. Newsome, Kingwood, TX (US); Charles R. Nease, Kingwood, TX (US); H. Kenneth Staffin, Colonia, NJ (US); Thomas R. Parr, Hillsborough, NJ (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/710,903

(22) Filed: Dec. 11, 2012

(65) Prior Publication Data
US 2013/0109818 A1    May 2, 2013

Related U.S. Application Data

(60) Continuation of application No. 13/344,457, filed on Jan. 5, 2012, now Pat. No. 8,349,264, which is a division of application No. 12/004,217, filed on Dec. 20, 2007, now Pat. No. 8,114,353.

(51) Int. Cl.
| | | |
|---|---|---|
| *B01J 19/00* | (2006.01) |
| *G05D 23/00* | (2006.01) |
| *G05D 7/00* | (2006.01) |
| *B01J 8/18* | (2006.01) |
| *F27B 15/00* | (2006.01) |
| *B01J 8/02* | (2006.01) |
| *B01J 35/02* | (2006.01) |
| *G05D 21/00* | (2006.01) |
| *C08F 2/00* | (2006.01) |
| *C08F 4/00* | (2006.01) |
| *B01J 23/00* | (2006.01) |
| *B01J 23/90* | (2006.01) |

(52) U.S. Cl.
USPC ........... 422/131; 422/129; 422/139; 422/198; 422/211; 700/266; 700/268; 700/269; 526/59; 526/60; 526/63; 526/64; 526/65; 526/66; 526/67; 526/72; 526/88; 526/89; 526/90; 502/20; 502/100

(58) Field of Classification Search
USPC ......... 422/108–111, 129, 131, 134, 138, 139, 422/141, 142, 146, 198, 211, 213, 219, 600, 422/630, 631, 634, 638, 644, 646, 649; 502/20, 100, 102–104, 107; 526/59, 526/60, 64–67, 72, 88–90, 63; 700/90, 266, 700/268, 269
See application file for complete search history.

(56) References Cited

U.S. PATENT DOCUMENTS

| | | |
|---|---|---|
| 3,525,590 A | 8/1970 | Bolton et al. |
| 4,022,580 A | 5/1977 | Rush |

(Continued)

FOREIGN PATENT DOCUMENTS

| | | |
|---|---|---|
| CA | 1290496 C | 10/1991 |
| WO | 9415940 A1 | 7/1994 |

(Continued)

OTHER PUBLICATIONS

DuPont™ Tyzor® Organic Titanates General Brochure, 2001, E.I. du Pont de Nemours and Company, pp. 1-11.

(Continued)

*Primary Examiner* — Natasha Young
(74) *Attorney, Agent, or Firm* — Conley Rose, P.C.; Rodney B. Carroll; Monte Rhodes

(57) ABSTRACT

Methods and systems for preparing catalyst, such as chromium catalysts, are provided. The valence of at least a portion of the catalyst sent to an activator is changed from Cr(III) to Cr(VI). The catalyst is prepared or activated continuously using a fluidization bed catalyst activator.

20 Claims, 3 Drawing Sheets

(56) References Cited

U.S. PATENT DOCUMENTS

| | | | |
|---|---|---|---|
| 4,136,061 | A | 1/1979 | Hogan et al. |
| 4,151,122 | A | 4/1979 | McDaniel et al. |
| 4,161,389 | A | 7/1979 | Staffin et al. |
| 5,169,913 | A | 12/1992 | Staffin et al. |
| 5,235,009 | A | 8/1993 | Hogan |
| 5,378,434 | A | 1/1995 | Staffin et al. |
| 5,866,661 | A | 2/1999 | Benham et al. |
| 6,144,897 | A | 11/2000 | Selliers |
| 6,489,428 | B1 * | 12/2002 | Debras et al. ............... 526/352 |
| 6,559,087 | B1 * | 5/2003 | De Lange et al. ............ 502/85 |
| 6,590,131 | B2 | 7/2003 | McGinn et al. |
| 6,936,665 | B2 | 8/2005 | Stephens et al. |
| 6,991,767 | B1 | 1/2006 | Staffin et al. |
| 7,133,784 | B2 * | 11/2006 | Vaidyanathan et al. ...... 702/30 |
| 7,384,885 | B2 | 6/2008 | Roger et al. |
| 7,402,635 | B2 | 7/2008 | Noll |
| 7,589,044 | B2 | 9/2009 | McDaniel et al. |
| 7,615,510 | B2 | 11/2009 | McDaniel et al. |
| 8,114,353 | B2 | 2/2012 | Benham et al. |
| 8,349,264 | B2 | 1/2013 | Benham et al. |
| 2004/0198927 | A1 * | 10/2004 | Battiste ........................ 526/60 |
| 2005/0255987 | A1 * | 11/2005 | McDaniel et al. ............ 502/38 |
| 2009/0088318 | A1 * | 4/2009 | McDaniel et al. ............ 502/208 |

FOREIGN PATENT DOCUMENTS

| | | | |
|---|---|---|---|
| WO | WO 94/15940 | * | 7/1994 |
| WO | 2009085104 A1 | | 7/2009 |

OTHER PUBLICATIONS

Foreign communication from a related counterpart application—International Search Report and Written Opinion, PCT/US2008/013529 dated Apr. 1, 2009, 7 pages.

Foreign communication from a related counterpart application—International Preliminary Report on Patentability, PCT/US2008/013529 dated Jun. 22, 2010, 6 pages.

* cited by examiner

US 8,790,579 B2

CONTINUOUS CATALYST ACTIVATOR

CROSS-REFERENCE TO RELATED APPLICATIONS

This application is a continuation application of U.S. patent application Ser. No. 13/344,457, filed Jan. 5, 2012 and published as US 2012/0108768 A1, which is a divisional application of U.S. patent application Ser. No. 12/004,217, filed Dec. 20, 2007, now U.S. Pat. No. 8,114,353 B2, both entitled "Continuous Catalyst Activator," each of which applications is hereby incorporated herein by reference in its entirety for all purposes.

FIELD OF THE INVENTION

The invention relates to methods and systems that can be used to prepare or activate catalysts, particularly chromium catalysts, for use in other process units, such as polymerization reactors.

BACKGROUND OF THE INVENTION

Catalysts, particularly chromium catalysts, can be used in polymerization reactions. When chromium catalysts are used in polyolefin production, the valence of the chromium catalyst needs to be (II) to effect polymerization. Chromium catalysts can be supplied commercially in the trivalent state as chromium (III), which is then converted to the hexavalent state which is chromium (VI). The chromium (VI) is then reduced to chromium (II).

Converting the valence of the chromium from (III) to (VI) can be achieved in batch processes that use large vessels subjected to thermal cycling and take relatively long periods of time to operate. The extreme temperature cycles require a relatively long period of time to cool down and heat up, which increases the time necessary to convert each batch of catalyst. A need exists for a process that can be operated efficiently without the use of extensively variant temperature cycles and that can further reduce manual aspects of the operations.

SUMMARY OF THE INVENTION

The present invention provides various methods and apparatus for preparing a catalyst in a fluidized bed continuous catalyst activator for use in polymerization reactors. A catalyst is processed in a continuous catalyst activator apparatus that minimizes the manual aspects of the operation and provides for continuous activation and movement of the catalyst through the activator system. The activation process can be controlled in a system that combines a polymerization reactor and a continuous catalyst activator wherein a controller provides feedback and adjustment of the activator by using comparison of various polymerization reactor parameters. The activated catalyst can be added directly into the polymerization reactor following activation, or can be stored for later discharge to the reactor. The design of the continuous catalyst activator can provide for activation of multiple catalysts simultaneously.

For example, a catalyst comprising chromium supported on an inorganic oxide carrier can be transferred to a fluidized bed continuous catalyst activator where the catalyst is heated to a maximum temperature in the presence of at least one agent within the fluidized bed continuous catalyst activator. The at least one agent can be any suitable agent including, but not limited to, air, substantially pure oxygen, a mixture of air and an inert gas, a mixture of oxygen and an inert gas, or combinations thereof. The at least one agent can be included within a fluidizing gas that is used to fluidize the catalyst. The catalyst is maintained at the maximum temperature for an average hold time. During the activation process, the catalyst is contacted with the at least one agent to convert a valence of at least a portion of the chromium contained within the catalyst from its trivalent state (hereinafter "Cr(III)") to a hexavalent state (hereinafter "Cr(VI)") to produce a valence-converted catalyst. The valence-converted catalyst is generally referred to as being "activated." This activation procedure stabilizes at least a portion of the chromium in the hexavalent state. If the catalyst is initially in the trivalent state, as is usually but not necessarily the case, it is oxidized, at least in part to the hexavalent state during activation. Catalysts that are in the hexavalent state require reduction and alkylation in order to polymerize olefins, monomers, or any chemical containing a carbon-carbon double bond. Hexavalent chrome catalyst is unstable and has a tendency to revert to Cr(III) unless the proper procedure is carefully executed. Conversion to Cr(VI) can be measured or estimated because it is positively correlated to the ultimate catalyst activity or capability for polymerization. After activation, the valence-converted catalyst is cooled in a presence of an oxygenating agent and then purged in a presence of an inert agent.

The valence-converted catalyst is then discharged. The discharged valence-converted catalyst can be stored for future use or it can be sent directly for use in another process unit, such as a reactor system. The aspect of the activation process wherein activated catalyst is introduced into the polymerization reactor can be operated in a substantially continuous or a substantially continual manner. For purposes of explanation, the term substantially continuous refers to the uninterrupted movement of activated catalyst from the continuous catalyst activator into the polymerization reactor. The term substantially continual refers to movement of activated catalyst from the continuous catalyst activator to a storage location from which it is periodically discharged to a polymerization reactor. The catalyst can be discharged from the activator and stored in a vessel from which it is continuously discharged into the reactor feed system. Once the catalyst is discharged from the activator, the activated catalyst can then be fed to the polymerization reactor either continuously or continually. A storage, surge, or holding vessel can be used downstream of the activator to store or hold catalyst prior to introduction into the reactor system. Throughout the description of various embodiments and aspects it is anticipated that the continuous catalyst activator is operated as a continuous process.

Reduction to Cr(II) requires a reducing agent. The reducing agent can be contacted with the catalyst comprising Cr(VI) during the activation process as another step in the activation process. This can take place in the existing equipment or can take place in additional or modified equipment. The reducing agent can also be contacted with the Cr(VI) catalyst in the polymerization reactor system which might include the feed system or the reactor itself. Reducing agents can include, but are not limited to, carbon monoxide, alkyls, olefins, monomers, ethylene, and hydrogen.

As one embodiment, a process for producing polyolefins using a continuous fluidized bed catalyst activator and a polymerization reactor in combination is provided. The activator activates catalysts, as described herein. The activated catalyst is then sent for use in the polymerization reactor. In an aspect, the activated catalyst can be sent to the reactor system as a substantially continuous or substantially continual process. Both a substantially continuous and a substantially continual process can provide activated catalyst in an amount necessary to operate the polymerization reactor. Additional process steps can be added to the processes described herein to obtain the desired physical or mechanical properties of the resulting resins. For example, the processes described herein can also include titanation, fluoridation, carbon monoxide reduction, other types of reductions, and/or reoxidation. Each of these additional process steps can be used individually or in various combinations as will be apparent to those of ordinary skill in the art.

Besides the methods described herein, the present invention also provides a controller for the operation of a polyolefin reactor and a continuous catalyst activator in combination to produce a polyolefin. A polymerization reactor process variable is compared to a reactor process variable set point and a continuous catalyst activator process variable is adjusted accordingly. In one aspect, a discharge stream process variable on the polymerization reactor is monitored and compared with a process variable set point. For example, an inlet process variable on the continuous catalyst activator can be adjusted based upon a comparison of the discharge stream process variable and the process variable set point. The discharge variables that can be monitored include conversion rate of Cr(III) to Cr(VI), color of the catalyst, catalyst activity, melt index of the polyolefin, rheological measurement, or combinations thereof. The inlet process variables that can be adjusted include catalyst feedrate, zone temperature, average catalyst residence time, fluidization gas flow, fluidization bed height, or combinations thereof. One aspect comprises a controller that is programmed with an algorithm to control a discharge process stream variable on the polyolefin reactor by adjusting an inlet process variable on the continuous catalyst activator. The algorithm can include neural networks, partial least squares, principles, component regressions, first principles models, or combinations thereof to infer impending changes in the discharge process stream. The controller can be linked, contained as a component, and/or exist as a step in the control process or logic of the reactor, the reactor system, the facility, or the complex comprising the controller. The control process can comprise one or more programmable logic controllers, distributed control systems, or combinations.

Various configurations of a continuous catalyst activator apparatus are provided for example, a fluidized bed system for continuously preparing a catalyst. In an embodiment, the fluidized bed system comprises a single horizontal fluid bed vessel or fluidized bed catalyst activator that contains a gas distributor plate, an inlet, a plurality of zones, at least one zone dividing wall, a plurality of baffles, a plurality of gas lines, a final outlet, and a means for independently controlling the temperature of each zone.

In some aspects, the gas distributor plate can be any design or configuration capable of producing a uniform and efficient distribution of gas across the surface of the bottom of the vessel. The inlet can be used for introducing the catalyst into the vessel. The at least one zone dividing wall divides the vessel into the plurality of zones. At least one of the zone dividing walls contains a zone opening that allows the catalyst to be introduced into a next downstream zone. Each zone contains a plurality of baffles with each baffle defining a stage. The vessel can contain any suitable number of stages, for example, from about 4 stages to about 75 stages. The zones can contain a different number of stages within each zone. Each baffle can include a plurality of apertures to allow the catalyst to flow through each stage so that the fluidizing gas and the catalyst are in contact with one another. A bottom portion of each stage is defined by at least a portion of the gas distributor plate. If screw-cap dispensing heads are present, at least a portion of the screw-cap dispensing heads can be used to introduce the fluidizing gas into each zone within the fluid bed vessel. The initial outlet is associated with each stage for removing the fluidizing gas. The final outlet allows for removal of the catalyst from the vessel.

Filters can be positioned at any suitable location in the continuous catalyst activator to capture particles as necessary. Such particles can then be discarded or returned to the process. The filters can be positioned inside or outside the vessel at any suitable location along the continuous catalyst activator.

The continuous catalyst activator system can also include a polymerization reactor that produces a polymer using the catalyst that is activated in the activator. Additional components of the system can be present, as described herein.

BRIEF DESCRIPTION OF THE DRAWINGS

The drawings illustrate only particular embodiments representative of the invention and are not to be considered limiting of the invention's scope. It is intended that these drawings may include other equally effective embodiments.

DETAILED DESCRIPTION OF THE INVENTION

Figure 1:
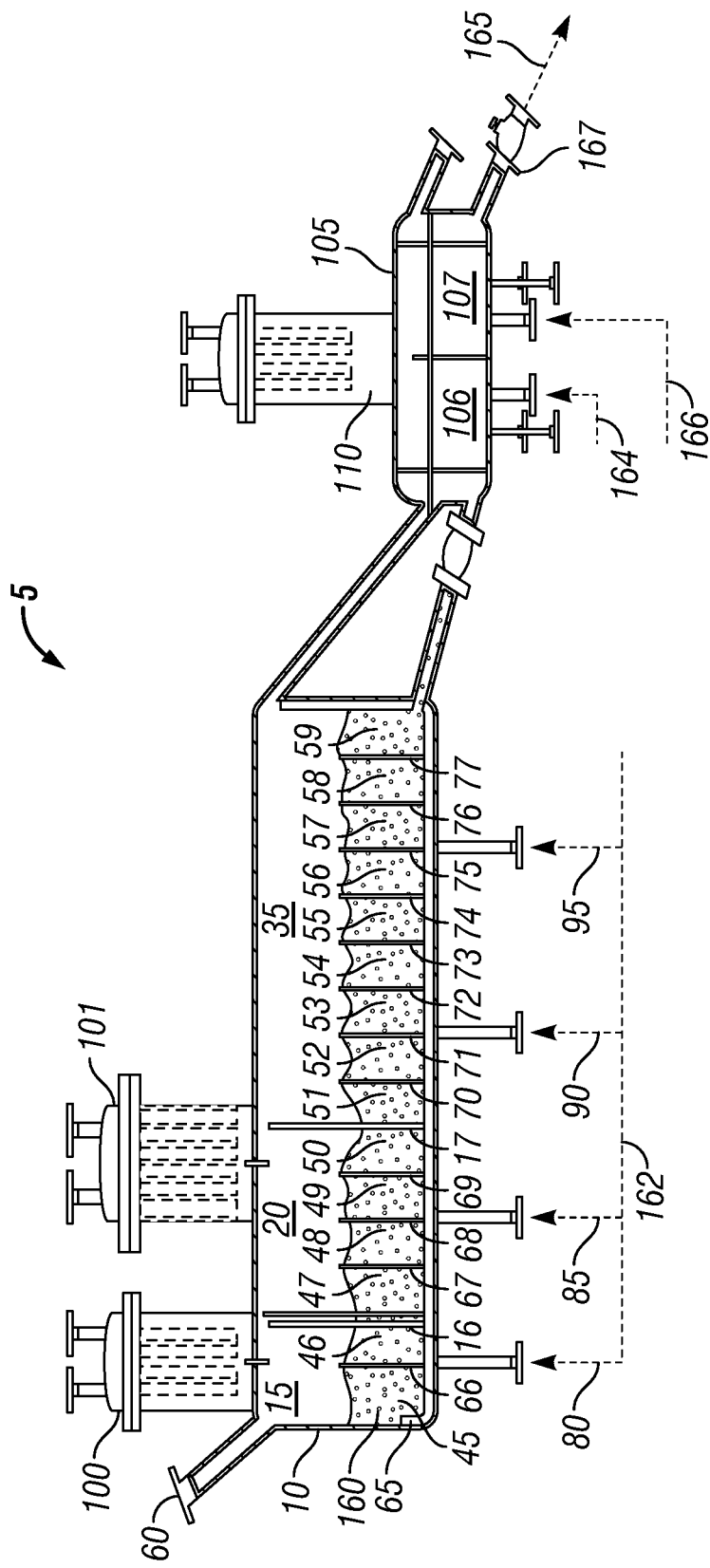
FIG. 1 represents a partial cross-sectional view of a continuous catalyst activator and cooling system.

Various continuous catalyst activators and systems are anticipated as presented in the following descriptions. In an aspect, the continuous catalyst activator 5 can comprise a single substantially horizontal fluid bed vessel 10 that allows for fluidization of the catalyst 160, so that the catalyst 160 behaves "fluid-like" and can be transported without mechanical means. Substantially horizontal means the slope from the horizontal of the vessel or the gas distributor plate, the slope of one zone to another zone, or the slope of the plurality of zones is essentially about 0 degrees; alternatively less than 30 degrees, alternatively less than 10 degrees, or alternatively less than 5 degrees. The continuous catalyst activator could be designed to have any suitable orientation. The continuous catalyst activator in this invention is not limited by physical arrangements or orientations of the vessel and zones, including the size and shape of the various structures comprising the vessel and zones, or any of the apertures comprising any of the structures of the continuous catalyst activator. The fluid bed vessel 10 contains a gas distributor plate 65; an inlet 60; a plurality of zones 15, 20, 35; at least one zone dividing wall 16, 17; a plurality of baffles 66-77; a final outlet 167; and a means for independently controlling the temperature of each zone.

In some embodiments, the gas distributor plate 65 can be any design capable of producing a uniform and efficient distribution of a fluidizing gas 162 across the surface of the bottom of the vessel 10. For example, in an aspect, the gas distributor plate 65 can include a plurality of small diameter holes drilled through the bottom of the vessel 10. In another aspect, the gas distributor plate 65 can be a metal screen, a sieve mesh, a porous sintered metal, or a porous sintered ceramic material. In an embodiment, the gas distributor plate 65 can include a plurality of screw-cap dispensing heads that allow passage of the fluidizing gas 162 throughout the vessel 10 for fluidizing the catalyst 160. The gas distributor plate 65 maintains fluidization conditions throughout the vessel 10 so that the catalyst particles are transported between stages and zones. The inlet 60 can be used for introducing the catalyst 160 into the vessel 10. In an aspect, the gas distributor plate 65 can be installed in the vessel 10 so that the gas distributor plate 65 slopes to aid in the movement of the catalyst 160 through the stages, but sloping is not required.

The at least one zone dividing wall 16, 17 divides the vessel 10 into the plurality of zones 15, 20, 35. The zone dividing walls 16, 17 substantially seal a particular zone from the adjacent zone. The zone dividing walls extend substantially perpendicular to, above, and below the gas distributor plate 65. At least one of the zone dividing walls 16, 17 contains a zone opening that allows the catalyst to be introduced into a next downstream zone. Each zone contains one or more baffles 66-77 with each baffle defining a stage 45-59. The vessel 10 can comprise any suitable number of stages such as between about 4 stages to about 75 stages; alternatively, from about 10 stages to about 50 stages; alternatively, from about 12 stages to about 20 stages; or alternatively, about 15 stages. In an aspect, the catalyst 160 travels through all of the stages 45-59 contained within the vessel 10 prior to being discharged from the vessel 10. The residence time between the zones 15, 20, 35 can vary. In some embodiments, the residence time decreases from the third zone 35 to the second zone 20 to the first zone 15. When the residence time increases from the first zone 15 to the second zone 20 to the third zone 35, the catalyst is subjected to step-wise progressively higher temperatures.

In some embodiments, the vessel 10 contains three zones 15, 20, 35. The first zone 15 can contain between 1 and 15 stages; alternatively, between 1 and 5 stages; or alternatively, between 1 and 2 stages. The second zone 20 can contain between 2 and 20 stages; alternatively, between 3 and 8 stages; or alternatively, between 4 and 7 stages. The third zone 35 can contain between 5 and 50 stages; alternatively, between 7 and 15 stages; or alternatively, between 9 and 12 stages.

Each zone can contain a different number of stages within it. For example, zone 15 can include two stages, zone 20 can include four stages, and zone 35 can include nine stages. Each stage acts essentially as a continuous stirred-tank reactor (CSTR) within the vessel 10. The multistage configuration facilitates a narrow residence time distribution of the fluidized catalyst 160 in the vessel 10. As the number of stages increases, the residence time distribution function of the catalyst 160 within each zone changes from a broad exponentially decaying function to an essentially plug flow distribution, with all catalyst 160 having an essentially equal residence time in each zone.

Each baffle contains a plurality of apertures to allow the catalyst 160 to flow through each stage by fluidized horizontal flow so that the fluidizing gas 162 and the catalyst 160 are in contact with one another. The apertures can be located on alternate opposite edges of the baffles to create a serpentine course of flow. Use of the serpentine course of flow helps control the residence time distribution of the catalyst 160 through the vessel 10. The movement of the catalyst 160 through the serpentine course of flow or maze simulates essentially plug flow of the catalyst 160 through the vessel 10 and prevents short-circuiting or bypassing of the catalyst 160 through the vessel 10 before the catalyst 160 experiences the ultimate average residence time.

A bottom portion of each zone is defined by at least a portion of the gas distributor plate 65. In embodiments that contain the plurality of screw-cap dispensing heads, at least a portion of the screw-cap dispensing heads introduce the fluidizing gas 162 into each zone of the fluid bed vessel 10. The initial outlet is associated with each zone for removing the fluidizing gas 162. The final outlet allows for removal of the catalyst from the vessel 10. Additional components of the continuous catalyst activator 5 can be present, as described herein.

Within each zone 15, 20, 35, the temperature is capable of being independently maintained. Catalyst 160 passing through the fluid bed vessel 10 is subjected to step-wise progressively higher temperature zones 15, 20, 35. This temperature profile replaces the long temperature ramp-times used in the conventional batch activator, which can substantially reduce the process time needed during the preparation or activation of the catalyst.

Other process parameters, such as residence time can be controlled. For example, the residence time for the catalyst 160 to progress through the entire fluid bed vessel 10 can be controlled by adjusting the catalyst 160 feed rate.

In an aspect, each zone is continuously in operation with respect to the flow of catalyst through the inlet and outlet of the zone. The zone dividing walls 16, 17 can be used to substantially separate a particular zone from an adjacent zone.

In an aspect, the continuous catalyst activator 5 further comprises a plurality of gas lines 80, 85, 90, 95 that supply the gas distributing plate 65 with the fluidizing gas 162. If screw-cap dispensing heads are present, then the plurality of gas lines can supply the fluidizing gas 162 through the screw-cap dispensing heads. The fluidizing gas 162 reaches the fluid bed vessel 10 by traveling through the gas distributor plate 65. The plurality of gas lines 80, 85, 90, 95 are capable of permitting selection of a fluidizing gas 162 for each zone 15, 20, 35. Each zone 15, 20, 35 can be fluidized with the same or a different fluidizing gas 162. The ability to select different temperatures and different types of fluidizing gases within each zone 15, 20, 35 enables operators to achieve various combinations that can affect the properties of the activated catalyst, as described herein.

In some aspects of this invention the continuous catalyst activator 5 can comprise filters to capture entrapped or entrained particles and return them to the fluidized bed. This is particularly useful when the catalyst contains fine particles (fines) or when the fluidization velocity is high. Filters may be of any type suitable for this purpose. This includes, but is not limited to, bag filters made of woven fiber, filters of sintered metal, or ceramic filters. Often these filters comprise "blow-back" capabilities in which the gas flow is temporarily reversed to knock off accumulated catalyst from the filter elements. These filters may be external to the vessel 10 or internal. External variants include, but are not limited to, bag filters that exist in separate locations and are connected by piping to the vessel 10. In this way fines are captured and can then be discarded, or returned to any part of the vessel 10. Alternatively the filters may be of the sintered metal or ceramic types and can be located in compartments located immediately above the vessel. In this way fines falling off the filter elements drop back into the fluidizing bed. In another aspect the filters can be located internally within the vessel, so that fines falling off the filter elements drop directly back into the bed from which they came. Filters can be oriented vertically or horizontally. When the filter elements are located internally, they can be oriented horizontally along the top of the vessel. Horizontal placement can allow all cells in the vessel to be serviced equally by the same filter elements. This arrangement can minimize or stop horizontal air flow between cells and thus can minimize the fines traveling between the cells in the gas phase. For example, the continuous catalyst activator 5 can include a filter apparatus 100, 101, 110 that is adapted to remove from the fluid bed vessel 10 any catalyst 160 entrapped in the fluidizing gas 162. Filtering the entrained catalyst 160 back to the vessel 10 enables more of the catalyst 160 to be activated and substantially prevents the catalyst from being lost overhead. Essentially no normally detectable amounts of catalyst 160 is lost overhead.

In some embodiments, filter apparatus 100, 101 can be provided above the activation stages to catch entrained catalyst particulate and return them to the activation bed. In some embodiments, within each filter 100, 101 is a plurality of gas permeable filter elements that can be alternated between filtration and blow-back according to a predetermined cycle to maintain continuous filtering performance. The filters 100, 101 can be designed to filter any size including micron sized particles. The size of the filters 100, 101 is designed to accommodate the air velocity and pressure rating of the process. Additionally, the filters 100, 101 are sized and shaped so that the filtered catalyst drops back into the fluidized bed and not onto the horizontal or slanted walls where it could stick. The filtering step can comprise any suitable filtering or separation procedure. This invention is not limited to any particular type or method of filtering, filtration, separation, or catalyst removal and reinjection into the process. For example, the separation might comprise a cyclone, an operation with some cyclonic force, or other suitable systems.

The filters 100, 101 can be positioned so that the airflow above the stages provides that the filtered catalyst is always sent back upstream from where it was taken. In this configuration, the catalyst entrained from one stage cannot be filtered and discharged into a later stage in the process. This arrangement prevents "short-circuiting" of the catalyst 160 through the vessel 10. Entrained catalyst is always sent back to its own stage or an earlier stage. A filter 110 can be used on the cooling system 105, also.

Besides the filters, other components can be present in the system. For example, the continuous catalyst activator 5 can also include a cooling system 105. The cooling system 105 can include at least two steps or stages, an initial step 106 and a final step 107. The initial step 106 cools the catalyst with an oxygenating agent 164 and the final step 107 purges the catalyst with an inert agent 166. As previously indicated, the oxygenating agent 164 can be air, substantially pure oxygen, a mixture of air and an inert gas, a mixture of oxygen and an inert gas, or combinations thereof. It is advisable that hot catalyst not be exposed to the inert agent 166 or to oxygen-deprive it while the catalyst remains at a high temperature. This may prevent the Cr(VI) from reverting to the Cr(III). Cr(VI) reverts to Cr(III) in the absence of oxygen between the temperatures of about 425° C. to about 875° C. Cr(VI) becomes more stable below 425° C. To prevent the reversion of the chromium (VI) to chromium (III), the initial step 106 uses the oxygenating agent 164 and the final step 107 uses an inert ambient compound 166, such as dry nitrogen. Other suitable oxidizing and inert ambient compounds will be apparent to those of skill in the art and are to be considered within the scope of the present invention.

Figure 2:
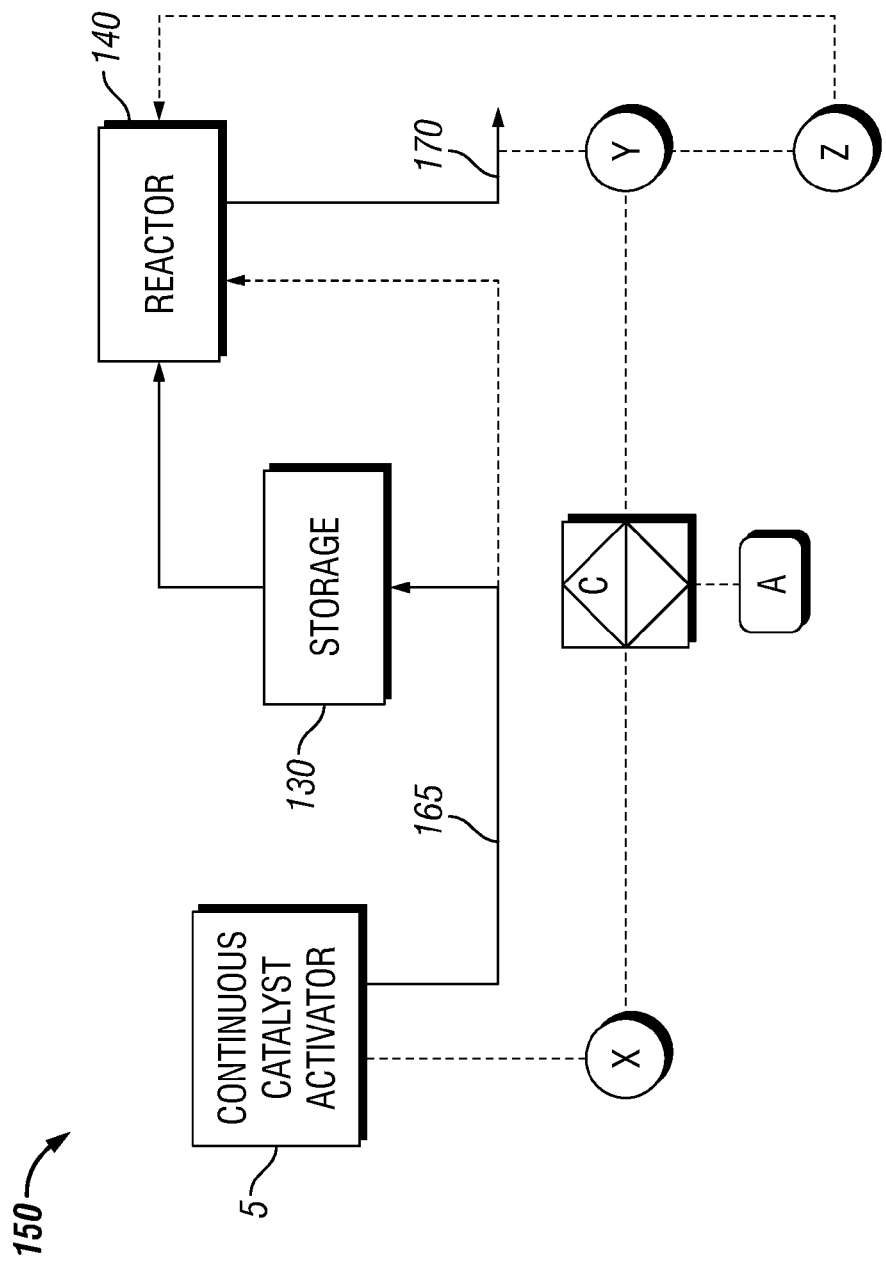
FIG. 2 represents a simplified flow diagram of a continuous catalyst activator system comprising a controller, a continuous catalyst activator, and a polymerization reactor.

As shown in FIG. 2, a continuous catalyst activator system 150 can comprise a polymerization reactor 140 for producing polyolefins using the activated catalyst 165 and a continuous catalyst activator 5. The system 150 can also optionally include a storage vessel 130 for storing the activated catalyst 165 prior to sending the activated catalyst to the reactor 140. To prevent reversion of the chromium (VI) to another valence, the activated catalyst 165 can be stored under dry nitrogen for later use. Other suitable components that can be added to the system 150 will be apparent to those of skill in the art and are to be considered within the scope of the present invention.

Figure 3:
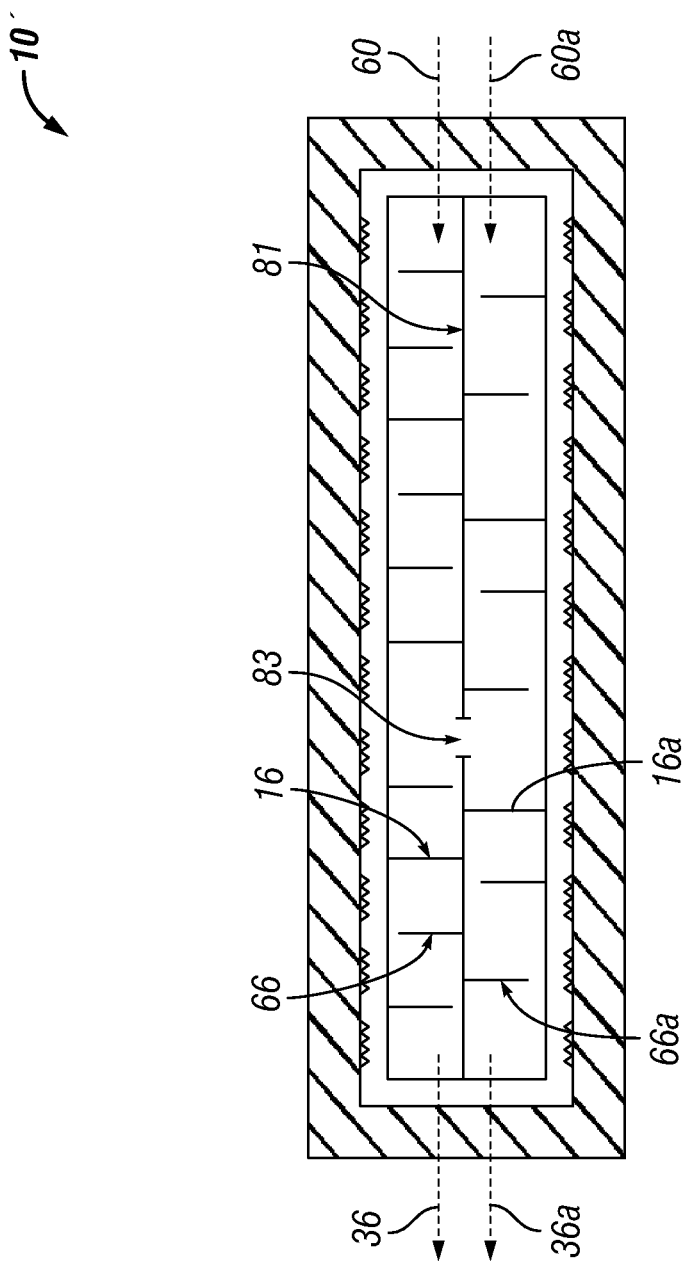
FIG. 3 represents a multiple chamber continuous catalyst activator vessel.

As shown in FIG. 3, more than one catalyst can be activated at a time. For example, an embodiment comprises a chamber dividing wall 81 so that essentially two isolated chambers are formed within the fluidized bed vessel 10'. In this embodiment, two different feed streams 60, 60a enter the fluidized bed catalyst vessel 10' and are activated in two separate chambers. Each chamber includes the same equipment as in the single chamber embodiments. For example, each chamber includes baffles 66, 66a and zone dividing walls 16, 16a. When more than one catalyst is being activated at a time, the exiting catalyst streams 36, 36a can be blended after exiting the fluidized bed of the continuous catalyst activator 10'. A blend port 83 can be included within the fluidized bed of the continuous catalyst activator 10' to enable the different catalysts to be blended within the fluidized bed of the continuous catalyst activator 10'. There are various possibilities for this aspect of the invention. For example, a vessel comprising multiple chambers could process multiple catalysts simultaneously. One aspect could produce a blend of catalysts capable of polymerizing a unique polymer. In another aspect multiple parallel activators could be operated and then utilize a single cooling jacket and/or other auxiliaries such as the filters. This arrangement could supply catalysts to single or multiple reactors, plants, or facilities and result in lower capital investment and energy usage.

It is anticipated that the continuous catalyst activator system can be used for activating catalysts for use in various polymerization reactors. In the following descriptions, polymerization of polyolefins is used for purposes of explanation. The following description provides a method of preparing a catalyst 160 in a continuous catalyst activator 5, as shown in FIG. 1. In this method, catalyst 160 comprising chromium supported on an inorganic oxide carrier is transferred to a fluidized bed continuous catalyst activator vessel 10 where the catalyst 160 is uniformly heated to a maximum temperature within the vessel 10. Once the catalyst 160 is in the vessel 10, the catalyst 160 is fluidized with a fluidizing gas 162 so the catalyst 160 can be transported similar to a liquid or fluid without requiring mechanical means for transporting the catalyst 160. The catalyst 160 is heated and maintained at the maximum temperature in the presence of at least one agent and for a hold time. In an aspect, the at least one agent can be air, substantially pure oxygen, a mixture of air and an inert gas, a mixture of oxygen and an inert gas, or combinations thereof. The at least one agent can be a component of the fluidizing gas 162. In an aspect, the fluidizing gas 162 comprises the at least one agent. In an aspect, the fluidizing gas 162 can be preheated prior to entering the vessel 10. During the hold time, the catalyst 160 is contacted with the at least one agent to convert a valence of at least a portion of the chromium contained within the catalyst 160 from Cr(III) to Cr(VI) to produce a valence-converted or activated catalyst. After the hold time has lapsed, the valence-converted catalyst is cooled in the presence of an oxygenating agent 164 and then purged in the presence of an inert agent 166. In an aspect, the oxygenating agent 164 can be air, substantially pure oxygen, a mixture of air and an inert gas, a mixture of oxygen and an inert gas, or combinations thereof. The valence-converted catalyst 165 is then discharged. The valence-converted catalyst 165 can be discharged into a storage vessel 130, as shown in FIG. 2, where it is maintained in an inert, dry atmosphere until it is needed.

The catalyst 160 that is fed to the vessel 10 can, and usually does, contain moisture. In some embodiments, moisture can to be removed from the catalyst 160 prior to sending the catalyst 160 to the vessel 10. In other embodiments, it is believed that the catalyst 160 can be sent to the vessel 10 without having to pre-dry the catalyst 160.

Several operating parameters can be adjusted to obtain desirable conversion rates, amounts of chromium converted, percentage of conversions, or the like of the catalyst 160 and properties of the resulting polyolefin product 170 produced using the activated catalyst 165. The operating parameters that can be adjusted include the linear space velocity of the fluidizing gas 162, chromium loading per square nanometer of surface area for the catalyst 160, activation temperature, temperature profile, and the like.

As an example, the feed rate of the catalyst 160 can affect the properties of the activated catalyst 165, the polyolefin product 170, or both. The rate at which the catalyst 160 is transferred or fed to the continuous catalyst activator 5 can vary between about 10 lb/hr to about 200 lb/hr; alternatively, from about 20 lb/hr to about 70 lb/hr; or alternatively, from about 35 lb/hr to about 50 lb/hr. The continuous catalyst activator can feed at least one polymerization reactor system, plant site, storage vessel, hold up tank or surge vessel. The continuous catalyst activator can feed at least one polymerization reactor directly or feed at least one storage vessel, hold up tank, or surge vessel directly or in combination. The continuous catalyst activator can feed one or multiple plants, facilities, reactors, storage vessels, or any combination thereof.

Another parameter that can be adjusted is the activation temperature used within the vessel 10. The activation temperature profile used can be tailored based upon the catalyst 160 that is being activated and the desired properties of the resulting polyolefin product 170. For example, in general, the higher the activation temperature, the higher the melt index potential of the polyolefin product 170, but other properties, such as the environmental stress crack resistance (ESCR), can be lowered. If a lower melt index is desired, then a lower activation temperature profile can be used.

In some embodiments, the maximum temperature at which the catalyst 160 is heated is in an overall range of about 300° C. to about 1000° C. In an aspect, heating the catalyst 160 can occur by heating the catalyst 160 at different temperature ranges within a plurality of zones. For example, when a high temperature activation is needed, a first zone 15 can be heated in a range of about 300° C. to about 700° C.; or alternatively, from about 400° C. to about 600° C. A second zone 20 can be heated in a range of about 500° C. to about 900° C.; alternatively, from about 600° C. to about 850° C.; or alternatively, from about 650° C. to about 800° C. A third zone 35 can be heated in a range of about 750° C. to about 900° C. As another example, when a low temperature activation is needed, a first zone 15 can be heated in a range of about 300° C. to about 700° C.; or alternatively, from about 400° C. to about 600° C. A second zone 20 can be heated in a range of about 500° C. to about 750° C.; alternatively, from about 500° C. to about 650° C.; or alternatively, from about 550° C. to about 650° C. A third zone 35 can be heated in a range of about 500° C. to about 750° C. In other embodiments, the catalyst 160 can be heated at the same temperature range in the plurality of zones. Other suitable temperature profiles will be apparent to those of skill in the art and are to be considered within the scope of the present invention.

Various heating sources can be used in the methods and systems described herein. In some embodiments, the vessel 10 is heated using electrical heating. Use of electrical heating can reduce air emissions, green house gases, $NO_x$ or $SO_2$ emissions, and other emissions that are caused by using other types of heating sources, such as natural gas. Other suitable heating sources will be apparent to those of skill in the art and are to be considered within the scope of the present invention. The continuous catalyst activator has an advantage of using less energy than the batch activators because the batch process requires significant cycling of the temperature up and back down for the entire vessel during the heating and cooling steps. The continuous catalyst activator can be a staged process making it unnecessary to heat and cool the entire vessel. The vessel is also smaller and more contained, therefore less energy is required with the smaller, staged, continuous catalyst activator. The continuous catalyst activator could also discharge directly to the polymerization or storage process thereby eliminating some of the cool down necessary for manual handling in the batch system and further reducing energy consumption.

Another factor that can affect the conversion rate of the catalyst 160 or properties of the polyolefin product 170 is the average hold time of the catalyst 160 within the continuous catalyst activator 5 at the maximum temperature. When the catalyst 160 is heated, it is maintained at the maximum temperature for a hold time that ranges from about 2 hours to about 30 hours. In some embodiments, the hold time ranges between about 5 hours to about 30 hours; alternatively, from about 8 hours to about 20 hours; or alternatively, from about 10 hours to about 15 hours. Some catalysts could require hold times of about 1 minute to less than 2 hours. The hold time described above is the average time the catalyst is maintained at the hold temperature. The hold temperature is the maximum temperature in the activation process. The hold temperature could also be some other critical temperature other than the maximum temperature. The overall residence time is the average time it takes the catalyst to travel from one end of the vessel 10 to the other end.

In an aspect, the overall residence time can be spread across the plurality of zones by holding the catalyst 160 for different hold times within the plurality of zones. For example, the catalyst 160 can be held within the first zone 15 for a hold time that ranges between about 0.1 hours to about 6 hours; alternatively, from about 0.5 hours to about 4 hours; or alternatively, from about 0.5 hours to about 3 hours. The catalyst 160 can be held within the second zone 20 for a hold time that ranges between about 0.5 hours to about 15 hours; alternatively, from about 1 hour to about 8 hours; or alternatively, from about 1 hour to about 4 hours. The catalyst 160 can be held within the third zone 35 for a hold time that ranges between about 3 hours to about 15 hours; or alternatively, from about 5 hours to about 10 hours. The residence time comprising all three zones can be controlled by adjusting the catalyst 160 feed rate, the dimensions of the vessel 10, and other process variables described herein.

As previously described, other operating parameters can also be adjusted to affect the chrome conversion rate, the amount or percentage converted to Cr(VI), the properties of the catalyst 160, and/or the properties of the resulting polyolefin product 170. For example, the linear velocity of the fluidizing gas 162 can affect the catalyst quality. Generally, higher velocities are used to increase Cr(VI) conversion rates and catalyst quality, so long as smooth fluidization of the catalyst 160 can be maintained in the vessel 10. The Cr(VI) conversion is positively correlated to the catalyst activity. The polymer product quality can be better with higher catalyst activity due to lower catalyst residuals in the products obtained with higher activity. Chrome level in the resin is a product specification. Product quality includes, but is not limited to, clarity, color, gels, polymer mechanical properties, and polymer physical properties. The fluidizing gas 162 can be supplied at a linear velocity that ranges from about 0.1 ft/sec to about 0.7 ft/sec; alternatively, from about 0.2 ft/sec to about 0.5 ft/sec; or alternatively, from about 0.25 ft/sec to about 0.45 ft/sec.

Besides operating parameters, physical properties such as the size, dimensions and configuration of various components of the continuous catalyst activator 5 can also be adjusted to affect the conversion or properties of the catalyst 160 and the properties of the resulting polyolefin product 170. As examples, the physical size of the vessel 10, the number of zones, and the number of stages can be varied to achieve the desired conversion rates, catalyst properties, and polyolefin product properties.

In some embodiments, the method of preparing the catalyst 160 can also include the step of filtering at least a portion of the catalyst 160 and recycling the at least a portion of the catalyst back to the continuous catalyst activator 5. In an aspect, the filtering can be performed using high temperature HEPA filters 100, 101. When filters 100, 101 are used in conjunction with the vessel 10, essentially no normally detectable amount of catalyst is lost overhead, which increases the efficiency of the processes described herein. Because essentially no normally detectable amount of catalyst is lost overhead, more activated catalyst 165 can be produced during the process. The term "no normally detectable amount" means an amount that is hard to quantify within a short production window without extraordinary means. Some loss of catalyst might fall within the normal error of the test procedure. However, it would be considered response variation (error) in the testing procedure (or variation error originating from the operator) and includes collecting the amount of catalyst lost, transferring to a scale, and recording the amount weighed.

In an aspect, the step of heating the catalyst 160 and the step of cooling the valence-converted catalyst occur in separate vessels. In some embodiments, the step of heating the catalyst 160 occurs in at least one heating zone that contains at least one stage. The heating step can occur in the vessel 10. In another aspect, the step of cooling the valence-converted catalyst occurs in at least one cooling zone. The cooling step can occur in a vessel external to the vessel 10.

In some embodiments, as shown in FIG. 2, the step of discharging the valence-converted catalyst 165 includes continuously sending the valence-converted catalyst 165 to a reactor 140 comprising any suitable polymerization reactor system, including but not limited to a polyolefin polymerization reactor system, a polyethylene polymerization reactor system, a polypropylene polymerization reactor system, a loop slurry reactor system, a gas phase reactor system, or a batch reactor system. In other embodiments, the valence-converted catalyst 165 can be sent to storage 130 for future use.

As used herein, the terms "reactor" and "reactor system" can include various types of process equipment that are useful for achieving substantially stable process conditions for the reactor/reactor system. For example, an inlet surge vessel can be used to ensure that a constant feed supply of activated catalyst is sent to the reactor. Other suitable process equipment that is useful in operating the reactor/reactor system, such as process control valves, will be apparent to those of skill in the art and are to be considered within the scope of the present invention. When the catalyst is described as being "continuously" sent to the reactor, this can include continuously sending catalyst to the process equipment within the reactor/reactor system and/or sending the catalyst to the process equipment in any manner that will ensure that a continuous supply of activated catalyst is being fed to the reactor.

The chromium contained within the catalyst 160 that is prepared or activated in embodiments of the present invention can be a chromium compound supported on an inorganic oxide carrier. Examples of the chromium compound can include a chromium oxide, a chromium salt, an organochromium material, or combinations thereof. The inorganic oxide carrier can be any carrier that has a high surface area, a high pore volume, and is capable of forming an active catalyst upon activation.

The support, which can also be called the carrier, can comprise silica, silica-aluminum, silica-titania, alumina, silica oxide, alumina phosphate, phosphated alumina, titanated silica, silica-zirconia, clay, zeolite, or other suitable material. The chromium loading can range from about 0.1 wt. % to about 5 wt. %; alternatively, from about 0.2 wt. % to about 2 wt. %; or alternatively, from about 0.2 wt. % to about 1 wt. %. The surface areas can vary from about 100 $m^2/g$ up to about 1000 $m^2/g$; alternatively, from about 200 $m^2/g$ to about 700 $m^2/g$; or alternatively, from about 250 $m^2/g$ to about 600 $m^2/g$. The pore volumes can vary from about 0.6 g/cc to about 4 g/cc; alternatively, from about 0.9 g/cc to about 3 g/cc; or alternatively, from about 1.5 g/cc to about 2.5 g/cc. The average bulk densities can vary from about 0.2 g/cc to about 0.7 g/cc; or alternatively, from about 0.2 g/cc to about 0.5 g/cc. The average particle size can vary from 20 microns up to 500 microns; alternatively, from about 30 microns to about 200 microns; alternatively, from about 40 microns to about 150 microns; alternatively, from about 50 microns to about 150 microns; or alternatively, from about 50 microns to about 100 microns.

In an embodiment of the present invention, the catalyst 160 can have about 1% Cr, a surface area of about 300 $m^2/g$, a pore volume of about 1.6 cc/g, and an average particle size of about 100 microns. Suitable catalysts that can be used in the present invention include several grades that are commercially available from W.R. Grace Co. and are sold under the model numbers 969 MPI, 969MS, and HALDS and other suitable catalysts available from vendors of commercial catalysts. The catalyst particle size average, mean, median, or some other averaging method with a confidence limit, can be about 15 to 200 microns. The continuous catalyst activator is not limited to the amount of Cr in the catalyst, the average catalyst particle size for a polymerization catalyst, or other particle properties such as morphology (shape), bulk properties, packing factor or catalyst particle density so long as the particle is capable of being fluidized.

The valance state of the chromium before being activated can be Cr(III) or Cr(II), but most commonly it is Cr(III). After the activation at least some of the chromium is converted and remains in the Cr(VI) state. One measure of the success of the activation is how much of the chromium remains as Cr(VI). This "conversion" can be dependent on factors such as space velocity of the oxidizing agent, chromium loading per square nanometer of surface, activation temperature, temperature profile, and the like. While not meant as a binding theory, it is believed the space velocity of the oxidizing agent can be equal to or greater in the continuous catalyst activator than in the batch activator. The catalysts 160 of this invention typically have equal or higher conversion than that of the same catalysts activated similarly (using the same output and activation temperature profile) in a commercial batch process. This becomes more apparent at the higher activation temperatures where the Cr(VI) is more prone to decomposition. Other chromium valences can be present during part or all of the method steps described herein. It is believed that catalysts 160 made in accordance with embodiments of the present invention will have conversion rates that range from about 50% to about 100%; alternatively, from about 70% to about 100%; alternatively, from about 80% to about 100%; or alternatively, from about 90% to about 100%.

The methods, apparatus, and processes described herein can be used with various types of chromium catalysts. For example, when a resin with a higher melt index potential or a catalyst with higher productivity is desired, a catalyst that contains titanium can be used. Titanium-containing catalysts can be more expensive than non-titanium-containing catalysts. In many instances, it is more economical to add titanium to the catalyst rather than to purchase catalyst that already contains titanium. To accommodate the need for producing titanium-containing catalyst, the processes described herein can include the step of titanating the catalyst prior to heating the catalyst to the maximum temperature. To titanate the catalyst, the catalyst is contacted with a titanation agent at a titanation temperature prior to heating the catalyst to the maximum temperature. Suitable titanation agents include titanates, such as TYZOR® organic titanates by E.I. du Pont de Nemours & Co., Inc, or any such suitable compound commercially available.

Besides titanating catalysts, additional process steps can be added to the processes described herein as needed to obtain different desired physical properties in the resulting resins. One such step comprises reducing the valence state of the catalyst during the activation process, wherein the valence-converted catalyst is contacted with a reducing agent. The reducing agent can be any suitable reducing agents including alkyls, hydrogen, and carbon monoxide. For example, the carbon monoxide reduction process can be employed at a reduction temperature between 300° C. and 500° C., alternatively between 350° C. and 450° C. The partial pressure of the reducing gas can be any suitable pressure from sub-atmospheric to relative high pressure, but the simplest reducing operation is to utilize about 5 to 25 volume % carbon monoxide, diluted in nitrogen, at about atmospheric pressure.

Once the catalyst has been reduced, it may be beneficial to reoxidize the catalyst. In some aspects, reoxidizing a catalyst that has been previously reduced increases the MI potential for the chromium catalyst, provides for better chromium conversion, and exhibits a different rheological response. The rheological response can be characterized by a narrower molecular weight distribution or a lower level of long chain branching and can be measured by some shear response. Generally, reduced and reoxidized catalysts will produce resins with a lower HLMI/MI ratio (high load melt index divided by the melt index) To reoxidize the catalyst, the valence-converted catalyst that has been reduced can be contacted with a second oxygenating agent prior to purging the valence-converted catalyst. The second oxygenating agent can be the same as or different from the first oxygenating agent. The re-oxidation temperature can range from the reduction temperature to a temperature greater than the maximum hold temperature, for example, between 450° C. and 1000° C.

As another embodiment of the present invention, a process for producing a polyolefin product 170 using a continuous catalyst activator 5 and a polymerization reactor 140 in combination is provided. One aspect comprises producing a polyolefin using a controller C, a polymerization reactor 140, and a continuous catalyst activator 5, the combination shown in FIG. 2 as a continuous catalyst activator system 150. A polymerization reactor process variable is compared to a reactor process variable set point and a continuous catalyst activator process variable is adjusted accordingly. Such polymerization reactor process variables can include, but are not limited to, melt index of the polymer, a polymer rheological measurement, ethylene flow into the reactor, ethylene flow out of the reactor, isobutane flow into the reactor, isobutane flow out of the reactor, hexene flow into the reactor, hexene flow out of the reactor, hexene conversion in the reactor, hydrogen flow into the reactor, hydrogen flow out of the reactor, hydrogen conversion in the reactor, polymer flow out of the reactor, liquid flow out of the reactor, total mass flow into the reactor, total mass flow out of the reactor, total volume flow out of the reactor, catalyst flow into the reactor, catalyst flow out of the reactor, concentration of ethylene in the reactor liquid, concentration of hexene in the reactor liquid, concentration of hydrogen in the reactor liquid, temperature of the reactor, pressure of the reactor, weight concentration of solids in the reactor slurry, volume concentration of solids in the reactor slurry, weight concentration of solids in the settling leg solids bed, number of settling legs, bulk density of reactor polymer, density of reactor polymer, residence time of reactor solids, catalyst activity, catalyst productivity, catalyst activity factor, terminal velocity of settling polymer, polymer settling rate, rate of polymer leaving the reactor that is not part of the settling leg solids bed, rate of slurry leaving the reactor that is part of the settling leg solids bed, polymer diameter, Archimedes number for polymer settling in settling leg, Reynolds number for polymer settling in settling leg, cross sectional area of a settling leg occupied by polymer, cross sectional area of a settling leg, density of catalyst, or combinations thereof.

In an aspect, the controller C can be programmed with an algorithm A to control a discharge process stream variable Y on the polyolefin reactor 140 by adjusting an inlet process variable X on the continuous catalyst activator 5. As in other embodiments, the controller C can be programmed with an algorithm A that is selected from neural networks, partial least squares, principles, component regressions, first principles models, or combinations thereof to infer impending changes in the discharge process stream variable Y.

In one aspect, a discharge stream process variable Y on the polymerization reactor 140 is monitored and compared with a reactor process variable set point Z, as shown in FIG. 2. An inlet process variable X on the continuous catalyst activator 5 is then adjusted based upon a comparison of the discharge stream process variable Y and the process variable set point Z. The discharge stream process variable Y that can be monitored can include catalyst activity, melt index, density or rheological parameter of the polyolefin product 170, the production rate of the reactor, or combinations thereof. The inlet process variable X that can be adjusted can include a catalyst feedrate to the activator, a zone temperature, a catalyst hold time, a fluidizing gas 162 linear velocity, the type of fluidizing gas 162 used, or combinations thereof. The step of adjusting the inlet process variable X can be performed using a controller C programmed with an algorithm A selected from neural networks, partial least squares, principles, component regressions, first principles models, or combinations thereof to infer impending changes in the discharge process stream. Other suitable types of controllers C that are capable of adjusting the inlet process variable X will be apparent to those of skill in the art and are to be considered within the scope of the present invention.

As another embodiment of the present invention, a fluidized bed system 5 for continuously preparing a catalyst 160 is provided, as shown in FIG. 1. In the continuous catalyst activator 5, a uniform composition results when each catalyst particle has a hold time or residence time to be in contact with the circulating fluidizing gas 162 that is closest to the average of all catalyst 160. The design of the continuous catalyst activator 5 of this invention can produce a similar quality of catalyst as in the batch activator, including equally high catalyst activity, polyolefin product melt index potential, and catalyst Cr(VI) conversion at a much shorter overall residence time that is approximately 40% to 90% of that needed in the batch activator processes. When compared to catalysts that are activated by a batch activator at the same or similar hold times and hold temperatures the continuous catalyst activator can produce equal or greater conversion to Cr (VI), produce higher activity catalysts, and produce catalysts capable of producing resins with improved melt index potential.

Because the processes and systems described herein are more efficient at the same throughput than batch processes and systems, it is believed that smaller equipment can be used at the same or greater capacity, which reduces the initial capital investment required to install and operate such systems. Because the actual activator itself is not heated and cooled, as in batch activation processes, the mechanical integrity of the activator is better than in batch activators, which in turn helps the activator to last longer. Furthermore, less cycling of the heating and cooling steps in the continuous activation process can utilize less energy and reduce greenhouse gasses. A comparison of utility costs for batch activators and the continuous activator is demonstrated in Table 1. The utility costs are estimated using basic assumptions for comparison. These assumptions may be derived from actual experience with batch activator operation. It is assumed that the continuous catalyst actvator system is operated over 8,000 hours annually with a 93% stream factor (8,000 hours/12,400 hours per year) and maximum activations. Fuel costs include a fuel gas cost of $5.73/MM BTU and/or an electric cost of $0.05866 kwh. Examples A through C are batch activators while Examples D and E are continuous activators. Example A and B are for gas fueled batch activators, each having different activation capacities. Examples C and D each combine gas and electric activation, however, Example C is a batch activator and Example D is a continuous activator. Example E is an electric continuous activator. The table demonstrates that the electric continuous catalyst activator will provide considerable cost reduction.

TABLE 1

Comparison of Batch and Continuous Activators

| Reactor/ Activator | Activator Utility Costs $/lb activated catalyst | Annual Activator Capacity M lbs/yr | Annual Activator Utility cost $M |
|---|---|---|---|
| A | 0.25 | 342 | 86 |
| B | 0.38 | 244 | 93 |
| C | 0.58 | 210 | 122 |
| D | 0.27 | 400 | 108 |
| E | 0.075 | 400 | 30 |

While the invention has been shown or described in only some of its forms, it should be apparent to those skilled in the art that it is not so limited, but is susceptible to various changes without departing from the scope of the invention. For example, various types of fluidizing gases can be used, various metallurgies can be used for the activator and other system components, and the like. Other suitable variations from the methods and systems described herein will be apparent to those of skill in the art and are to be considered within the scope of the present invention.

We claim:
1. A polymerization system comprising:
 (a) a polymerization reactor,
 (b) a continuous catalyst activator comprising: a fluidized bed, wherein the continuous catalyst activator comprises:
  (1) a substantially horizontal fluidized bed vessel;
  (2) a gas distributor plate extending substantially horizontal within the fluidized bed vessel being arranged to allow passage of a fluidizing gas throughout the fluidized bed vessel;
  (3) an inlet for introducing a catalyst into the fluidized bed vessel;
  (4) at least one zone dividing wall for dividing the fluidized bed vessel into a plurality of zones, at least one of the zone dividing walls comprising a zone opening that allows the catalyst to be introduced into a next downstream zone, the plurality of zones being located substantially horizontal in relation to one another; and
  (5) each zone comprising at least one baffle, each baffle defining a stage, each zone comprising a lower boundary that comprises at least a portion of the gas distributor plate, and
 (c) a controller programmed with an algorithm to control a polymerization reactor process variable by adjusting a continuous catalyst activator process variable, and wherein at least one of the following conditions is satisfied:
  the continuous catalyst activator further comprises a filter apparatus adapted to remove any catalyst particles entrained in the fluidizing gas; and/or
  the polymerization system further comprises an inlet titanation agent disperser.

2. The polymerization system of claim 1, wherein the continuous catalyst activator comprises sufficient baffles to cause an essentially plug flow profile through the fluidized bed vessel.

3. The polymerization system of claim 1, wherein the continuous catalyst activator comprises sufficient baffles to cause an essentially plug flow profile through the fluidized bed vessel.

4. The polymerization system of claim 1, wherein the continuous catalyst activator further comprises a reduction stage.

5. The polymerization system of claim 4, wherein the continuous catalyst activator further comprises a reoxidizing stage.

6. The polymerization system claim 1, wherein the continuous catalyst activator further comprises a cooling system wherein an oxidizing stage cools the catalyst with a first oxidizing ambient compound and a purge stage purges the catalyst with a first inert agent.

7. The polymerization system of claim 1, wherein the continuous catalyst activator further comprises a reduction stage.

8. The polymerization system of claim 7, wherein the continuous catalyst activator further comprises a reoxidizing stage.

9. The polymerization system of claim 1, further comprising a chamber dividing wall that enables more than one catalyst to be prepared simultaneously.

10. A method comprising;
 (a) introducing a catalyst comprising chromium into a continuous catalyst activator;
 (b) introducing a fluidizing gas into the continuous catalyst activator to yield a fluidized bed of the catalyst;
 (c) heating the catalyst within the continuous catalyst activator while maintaining flow of the catalyst through the continuous catalyst activator such that the catalyst is maintained at a hold temperature for an average hold time;
 (d) contacting the catalyst with at least one agent to convert at least a portion of the chromium from Cr(III) to Cr(VI) to produce a valence-converted catalyst;

(e) reducing at least a portion of the valence-converted catalyst from the Cr(VI) state to a Cr(II) state to produce a reduced valence-converted catalyst;
(f) discharging the valence-converted catalyst from the continuous catalyst activator, wherein discharging the valence-converted catalyst from the continuous catalyst activator comprises:
  cooling the valence-converted catalyst in a presence of a first oxygenating agent in a separate cooling system downstream of the fluidized bed catalyst activator; and
  purging the valence-converted catalyst in a presence of a first inert agent in the separate cooling system;
(g) introducing the valence-converted catalyst into a polymerization reactor system, or a combination of polymerization reactors;
(h) polymerizing a polyolefin product with the reduced valence-converted catalyst; and
(i) adjusting a process variable of the continuous catalyst activator based upon a comparison of a polymerization process variable associated with polymerizing the polyolefin product and a polymerization process variable set point.

11. The method of claim 10, wherein the valence-converted catalyst is reduced before the polymerizing.

12. The method of claim 11, wherein adjusting the process variable of the continuous catalyst activator comprises:
  monitoring the polymerization process variable; and
  comparing the polymerization process variable with the polymerization process variable set point.

13. The method of claim 11, wherein the hold temperature is from about 300° C. to about 1000° C. and the average hold time at the hold temperature is from about 1 minute to about 30 hours.

14. The method of claim 10, wherein the hold temperature is from about 300° C. to about 1000° C. and the average hold time at the hold temperature is from about 1 minute to about 30 hours.

15. The method of claim 10, further comprising titan titanating the catalyst prior to heating the catalyst.

16. The method of claim 10, further comprising, after reducing at least a portion of the valence-converted catalyst, reoxidizing at least a portion of the reduced valence-converted catalyst in the Cr(II) state to the Cr(VI) state.

17. The method of claim 10, further comprising discharging at least 2 different valence converted catalysts from the continuous catalyst activator.

18. The method of claim 10, wherein the continuous catalyst activator comprises;
  (i) a gas distributor plate extending substantially horizontal within the fluidized bed vessel being arranged to allow passage of a fluidizing gas throughout the fluidized bed vessel;
  (ii) an inlet, for introducing a catalyst into the fluidized bed vessel;
  (iii) at least one zone dividing wall for dividing the fluidized bed vessel into a plurality of zones, at least one of the zone dividing walls comprising a zone opening that allows the catalyst to be introduced into a next downstream zone, the plurality of zones being located substantially horizontal in relation to one another; and
  (iv) each zone comprising at least one baffle, each baffle defining a stage, each zone comprising a lower boundary that comprises at least a portion of the gas distributor plate.

19. The method of claim 18, wherein the continuous catalyst activator comprises sufficient baffles to cause an essentially plug flow profile through the fluidized bed vessel.

20. The method of claim 18, wherein the hold temperature is from about 300° C. to about 1000° C. and the average hold time at the hold temperature is from about 1 minute to about 30 hours.

\* \* \* \* \*